UNITED STATES PATENT OFFICE.

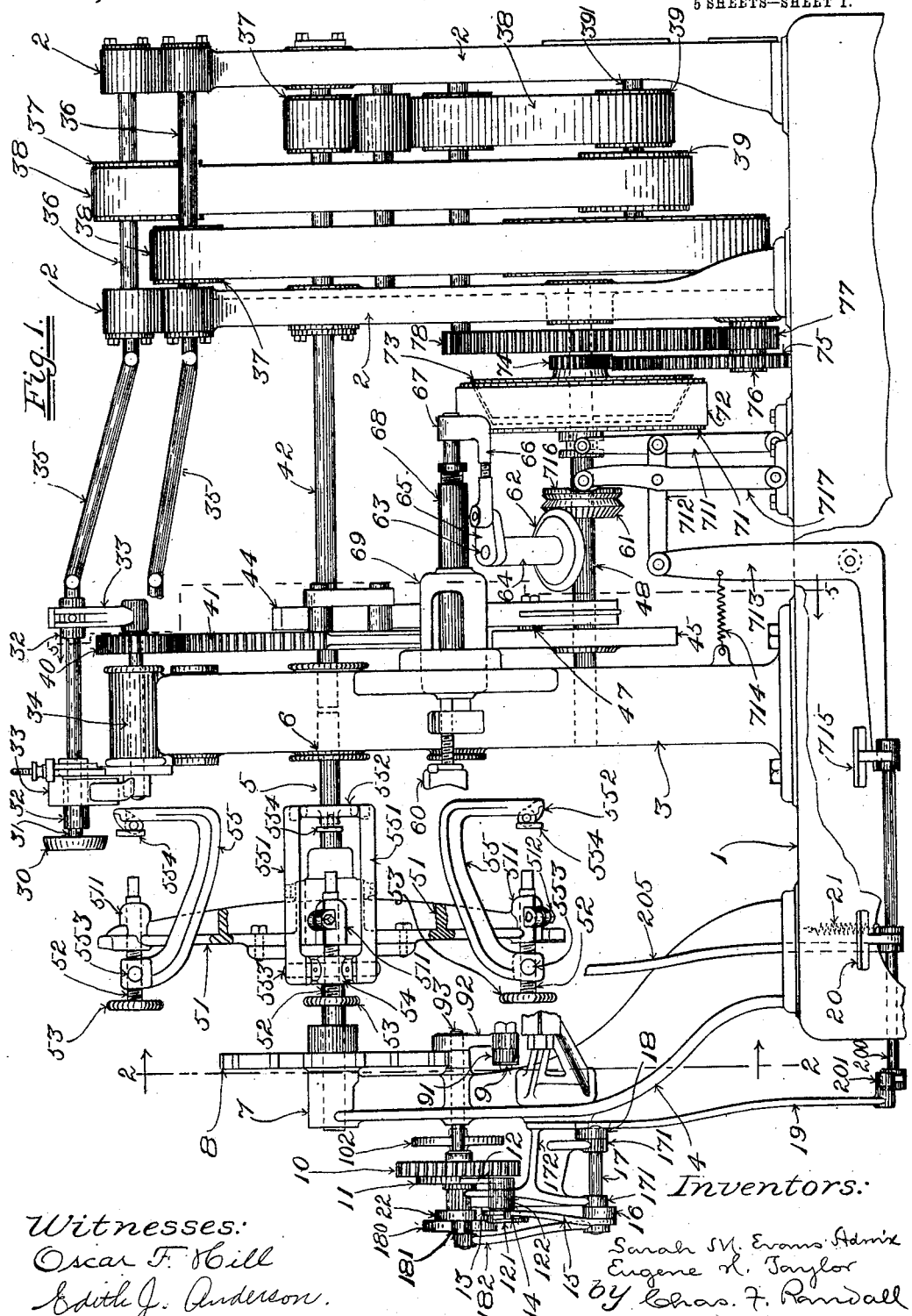

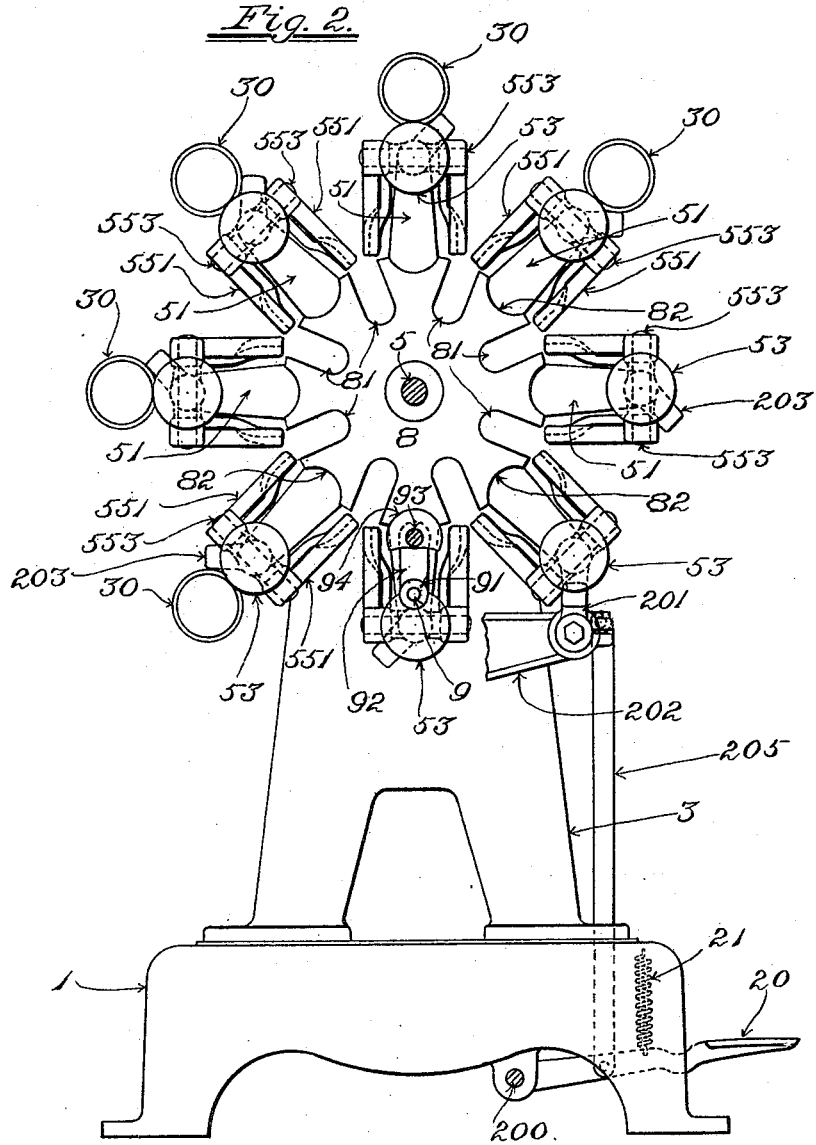

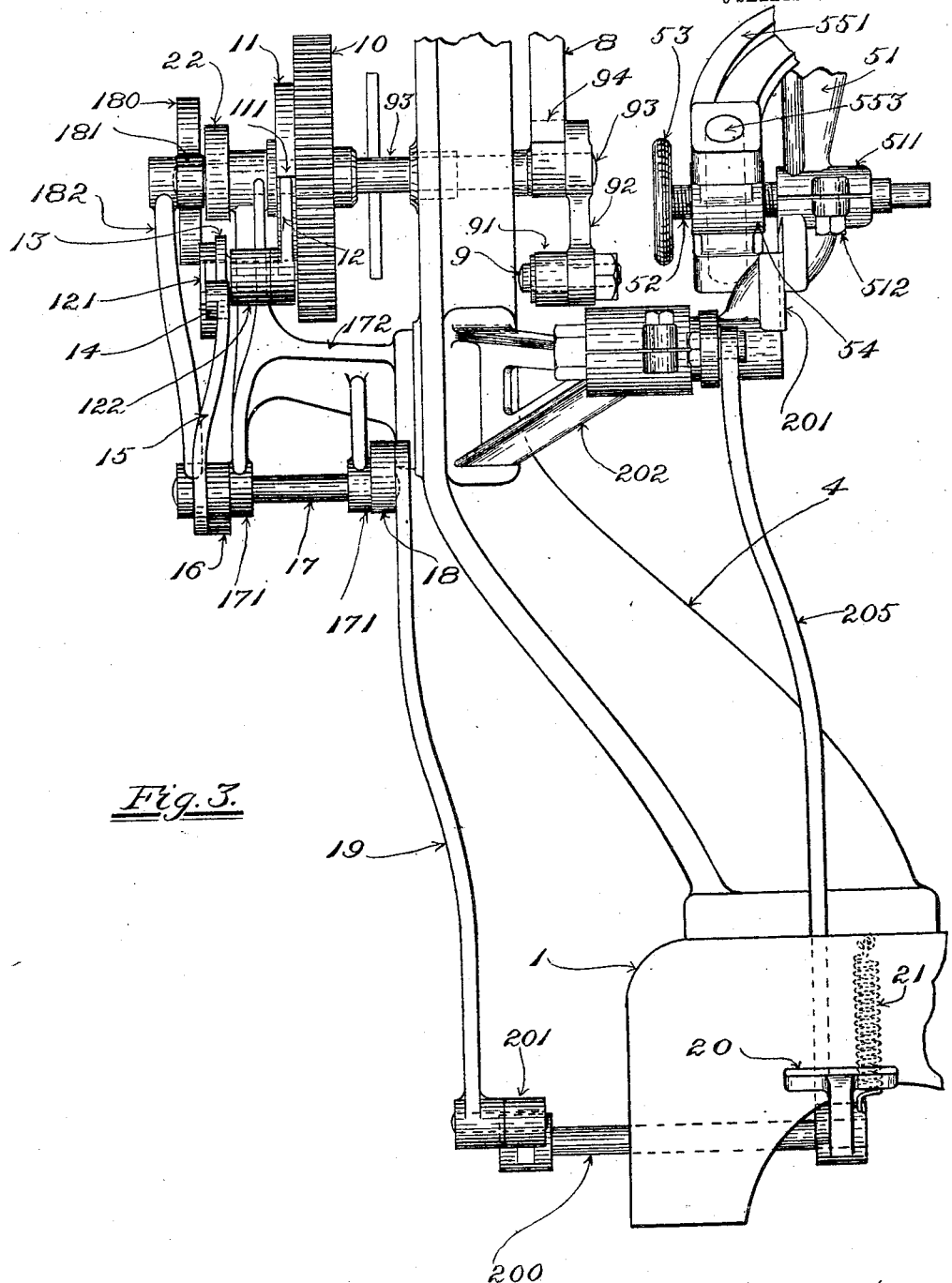

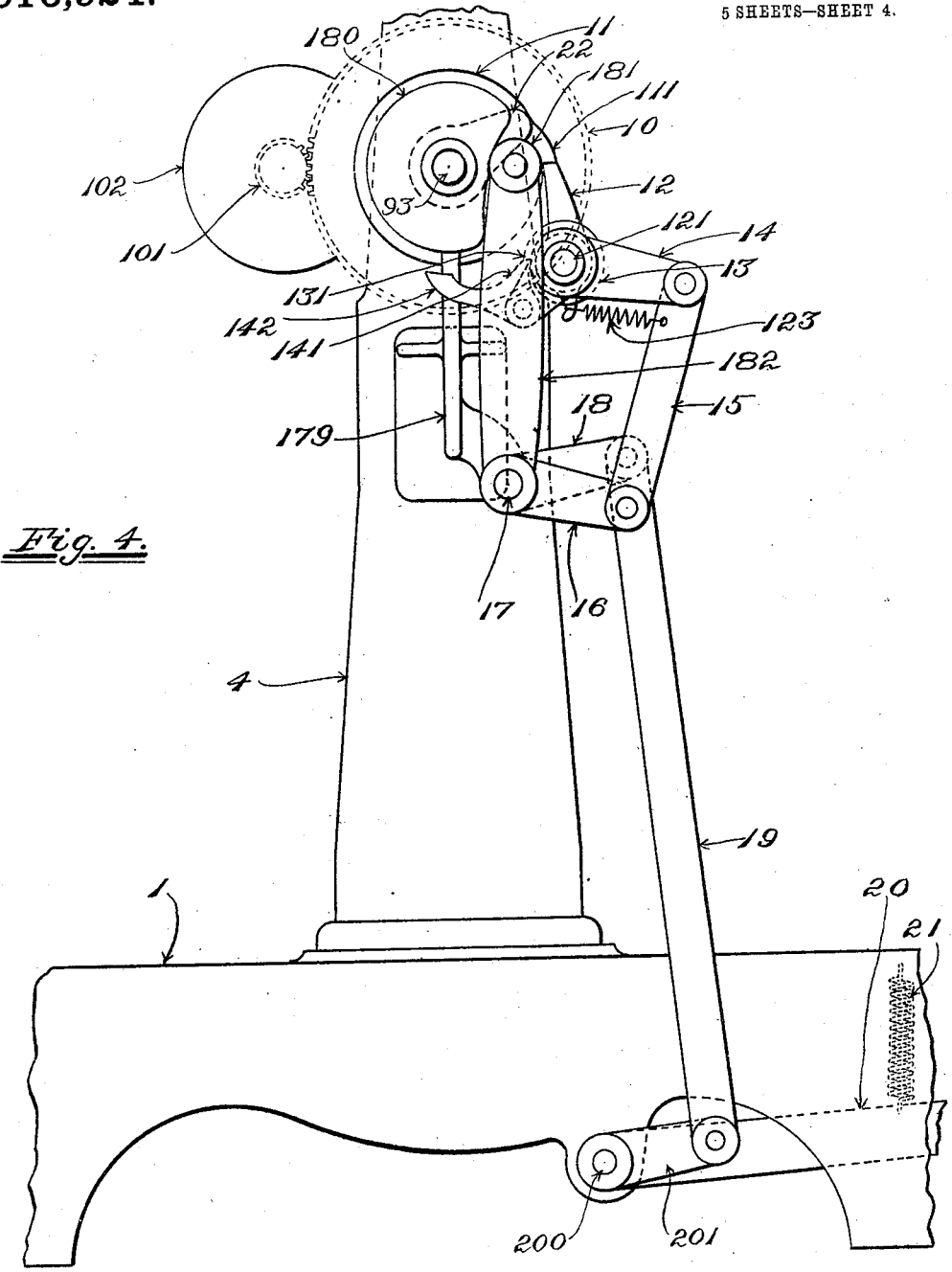

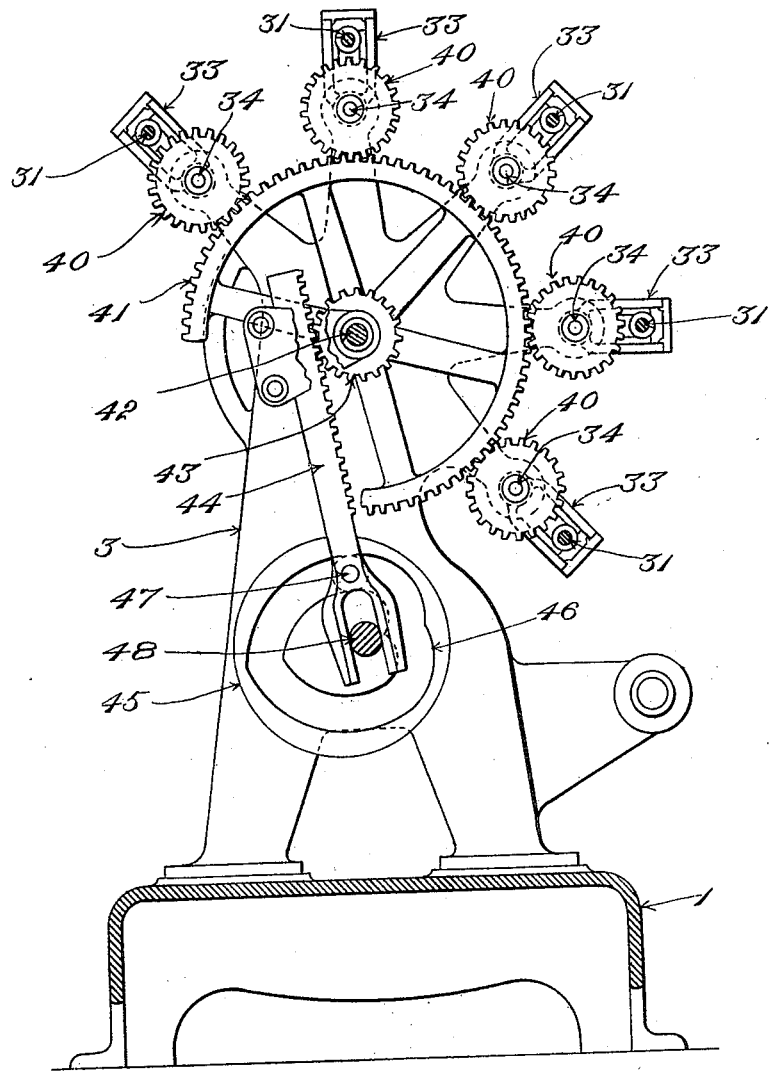

SARAH M. EVANS, OF EXETER, NEW HAMPSHIRE, ADMINISTRATRIX OF THE ESTATE OF WARREN C. EVANS, DECEASED, AND EUGENE H. TAYLOR, OF HYDE PARK, MASSACHUSETTS; CLARA M. DAVIS, ADMINISTRATRIX DE BONIS NON OF ESTATE OF SAID WARREN C. EVANS, DECEASED, AND SAID EUGENE H. TAYLOR ASSIGNORS TO THE AUTOMATIC HEEL TRIMMING AND BURNISHING MACHINE COMPANY, OF EXETER, NEW HAMPSHIRE, A CORPORATION OF MAINE.

MACHINE FOR FINISHING THE HEELS OF BOOTS AND SHOES.

No. 916,924.     Specification of Letters Patent.    Patented March 30, 1909.

Application filed July 14, 1906. Serial No. 326,274.

*To all whom it may concern:*

Be it known that WARREN C. EVANS, deceased, a citizen of the United States, formerly residing at Exeter, in the county of Rockingham and State of New Hampshire, and EUGENE H. TAYLOR, also a citizen of the United States, residing at Hyde Park, in the county of Norfolk and State of Massachusetts, did invent a certain new and useful Improvement in Machines for Finishing the Heels of Boots and Shoes, of which the following is a specification, reference being had therein to the accompanying drawings.

The invention is an improvement upon the machine forming the subject of the application for United States Letters Patent for machine for finishing the heels of boots and shoes, which was filed by Warren C. Evans and Eugene H. Taylor on August 9, 1902, Serial No. 119,065. The machine of the application aforesaid is provided with a series of tools suitable for performing a succession of heel-finishing operations, and with a work-carrier to which a boot or shoe requiring to have the heel thereof finished is applied. The work-carrier is furnished with a number of work-supports or jacks, thereby enabling the heels of a number of boots or shoes to undergo finishing operations at one time, and it has combined therewith power-actuated devices under the control of the operator whereby, at the will of the latter, it is shifted automatically to present the heel of each boot or shoe in turn to the action of the respective finishing tools, successively. The power-actuated shifting devices aforesaid comprise means for rotating the work-carrier step by step, and in connection therewith the machine is provided with means for moving the work-carrier in the direction of the length of its supporting-shaft prior to each advancing movement thereof to withdraw the work-carrier a sufficient distance relative to the tools to enable the boots or shoes and all portions of the work-supports or jacks carrying the same to entirely clear the tools in advancing, and for restoring it to its normal position with relation to the tools by a reverse longitudinal movement after the completion of the said advancing movement.

The objects of the present invention are to provide improved means for communicating the required step by step movements of partial rotation to the work-carrier at the will of the operator; to render unnecessary the movement aforesaid of the work-carrier in the direction of the length of the supporting-shaft thereof; and to provide an improved construction of work-support or jack.

An embodiment of the invention is shown in the accompanying drawings in which latter,—

Figure 1 is a front view of a heel-finishing machine embodying the principles of the present invention, certain portions being broken away and only such parts being shown as are required for the purpose of rendering clear the nature of the invention and the manner in which the invention may be reduced to practice. Fig. 2 is a view mainly in vertical section on the plane that is indicated by the dotted line 2, 2, in Fig. 1, looking in the direction that is indicated by the arrows adjacent the ends of the said dotted line. The base-portion of the stand 4 is omitted from this view. Fig. 3 is a view in elevation on an enlarged scale showing certain of the parts which are located at the left-hand end of the machine in Fig. 1. Fig. 4 is an elevation from the left-hand side in Figs. 1 and 3 showing the principal parts of Fig. 3. Fig. 5 is a view in vertical section on the plane that is indicated by the dotted line 5, 5, in Fig. 1, looking in the direction that is indicated by the arrows adjacent the ends of the said dotted line.

Having reference to the drawings,—at 1 is represented the base-portion or bed of the machine. 2, 2, Fig. 1, are uprights parallel with each other rising from the said bed or base adjacent the right-hand end thereof.

3 is an upright rising from an intermediate portion of the length of the bed or base, and 4 is an upright rising from the left-hand portion of the said bed or base.

The work-carrier is provided with a supporting-shaft 5, which is journaled at 6 and 7, respectively, Fig. 1, in bearings which are provided in connection with the intermediate upright 3 and end-upright 4, respectively, and in which bearings the said supporting-shaft is adapted to rotate. The work-carrier is furnished with a plurality of work-supports or jacks which are arranged equidistant from one another in a circular series that extend around the supporting-shaft 5, as indicated in Fig. 2. The finishing tools are arranged in practice in a curved series around the work-carrier upon the intermediate upright portion 3 of the machine-framing. In Fig. 1 only a breasting-cutter 60 and a rotary tool 30 are shown, the other tools of the series, together with the main part of their appurtenances, being omitted to secure simplicity in the drawings. In Fig. 2, however, the positions of five rotary tools 30, 30, etc., are indicated by double concentric circles, while in Fig. 5 the carriers for the said number of rotary tools are shown, together with the means for swinging the said carriers to communicate the required traverses to the tools. The work-carrier is shown constructed with a circular series of radial arms 51, 51, shown best in Fig. 2. Each arm of the said series, with its appurtenances, constitutes a work-support or jack. The said appurtenances comprise a screw 52, provided with a hand-wheel 53 for use in turning the same, and having a plain portion of its stem fitted within a split socket 511 with which the arm 51 is provided at or closely adjacent to its free end; a bolt 512, Figs. 1 and 3, by means of which the said split socket may be contracted tightly upon the said plain portion of the stem of screw 52; a cross-head 54 which is fitted upon the threaded stem of screw 52 at the outer side of arm 51, i. e., at the left hand side thereof in Figs. 1 and 3; and a double yoke 55 that is formed with opposite side-arms 551 and a cross-bar 552. The free ends of the said opposite side-arms of the yoke are connected pivotally, as at 553, 553, with the opposite ends of the cross-head 54. The side-arms are placed at opposite sides of the arm 51, with the cross-bar 552 at the inner or right-hand side of such arm in Fig. 1. Upon the cross-bar is mounted the swiveling plate or block 554. A form or last supporting a boot or shoe is applied to the inner or right-hand end of screw 52, with the wear-surface of the top-lift of the heel resting in contact with the working surface of the swiveled plate or block 554. Bolt 512 having been turned to loosen the hold of the split socket 511 upon the plain portion of the stem of screw 52, the said screw is rotated to adjust the yoke so as to compress the boot or shoe and form or last firmly between the said plate or block and the end of the screw 52. Then by sliding movement of the screw lengthwise through the split socket the work-support and boot or shoe held thereby are adjusted transversely with relation to the position of the rotating tools, and finally the bolt 512 is turned to tighten the split socket upon the plain stem of the screw 52 to hold the work-support and boot or shoe securely in the position of adjustment. The two side-arms 551, 551, of the yoke 55 are separated from each other a sufficient distance to permit the breasting-cutter 60 to pass between them in acting upon the breast of the heel of a boot or shoe that is applied to a work-support.

The work-carrier is of quite large dimensions radially, and has considerable weight. For the purposes of a shift, it is started from its position of rest, given a movement of partial rotation equal in extent to the angular distance between one work-support or jack and another, and then brought to rest again. By the step-by-step movements of the work-carrier a boot or shoe mounted upon one of the work-supports or jacks will be presented to one after another of the tools of the machine, with the heel of the said boot or shoe presented at each tool in position for being operated upon properly by such tool. Considerable strain devolves upon the actuating devices in starting the work-carrier, and considerable momentum is acquired by the work-carrier while in motion, necessitating special provisions for preventing the work-carrier from overrunning. The actuating mechanism in which one portion of the present invention resides has been designed to begin and terminate the movement thereof gradually, producing a movement which first is accelerated and then retarded, and to lock the work-carrier securely in its new position until a further shift thereof is caused to occur. Referring, now, to the embodiment of this portion of the invention which is shown in the drawings;—at 8 is a wheel which is fast upon the shaft 5 of the work-carrier. It is formed with a series of radial slots 81, 81, etc., the outer ends of which are open and are located at the periphery of the said wheel. The said radial slots correspond in number with the work-supports or jacks of the work-carrier. Between the respective slots the periphery of the wheel is formed with concavities 82, 82, etc.

At 9 is a pin that is attached to an arm or carrier 92 upon a shaft 93, which is mounted in a bearing or bearings in connection with the upright 4 of the fixed frame. From its function the said shaft is termed the work-carrier operating shaft. Upon the said pin is mounted a roll or trundle 91 that is adapted to work in the slots 81, 81.

94 is a convex portion or hub in connection with the carrier 92, the said convex portion or hub being adapted to fit the concavities 82, 82, of wheel 8. Normally, the convex portion or hub 94 occupies one of the said concavities, as shown in Fig. 2, locking the wheel 8 and work-carrier securely in position for the performance of the finishing operations upon the heels of boots or shoes which are supported by the work-carrier. For the communication of an advancing movement to the work-carrier, the operating-shaft 93 and arm or carrier 92 are rotated by driving power applied to the said operating-shaft. By occupying the concavity aforesaid, the locking convexity keeps the work-carrier locked during the rotation of the shaft and arm or carrier 92 until just before the roll or trundle 92 enters the outer end of an adjoining radial slot 81, at which time the convexity is turned out of the said concavity by the rotation of shaft 93, thereby leaving the work-carrier free to turn under the action of the said roll or trundle within such slot. The advancing movement of the work-carrier, being begun gradually, accelerated, retarded, and gradually arrested by the action of the roll or trundle against the walls of the slot, takes place and is ended without strain or possibility of overrunning, and at the conclusion thereof the locking convexity is caused by the continued rotation of the shaft 93 to enter the succeeding concavity which has been brought around to the same by the movement of the work-carrier, locking the work-carrier in its new position until the next advance is caused to take place.

The power-devices for automatically actuating the operating shaft 93 of the work-carrier at the will of the operator, to occasion an advance of the work-carrier, are shown in Figs. 1, 3 and 4. They comprise a spur gear-wheel 10 which is mounted upon the shaft 93 and is adapted to turn loosely thereon except when clutched to the said shaft; a driving spur-pinion 101, Fig. 4, meshing with the said gear 10 and in fixed connection with a band-pulley 102, to which latter in practice power is transmitted by means of a suitable driving-band (not shown) from a pulley on a suitable counter-shaft or the like; and clutching devices under the control of the operator by means of which the gear-wheel 10 is clutched to the shaft 93 for a rotation of the latter when required. The drawings show an application of a clutch of a well-known type, 11 being the disk pertaining to the said clutch, and 111, Figs. 3 and 4, the shoulder or projection at the periphery of the said disk which engages in usual manner with the controlling dog or pawl 12, the latter being mounted upon the short shaft 121 which is supported in the bearing 122, Figs. 1 and 3, which is provided in connection with bracket 172 projecting from fixed upright 4, the said controlling dog or pawl having in connection therewith the spring 123, Fig. 4, tending to hold the engaging end of the controlling dog or pawl within the path of rotation of the said shoulder. As is well-known, so long as the controlling dog or pawl remains in engagement with the shoulder the clutch remains open. Hence no movement will be imparted to the work-carrier operating shaft. At 13 is a disk that is fixed upon the said shaft 121 and provided with the shoulder 131, Fig. 4, and at 14 is a lever mounted loosely upon the said shaft 121, and having pivoted thereto the tripping dog or pawl 141 which normally stands in engagement with the shoulder 131. Lever 14 is connected by a rod 15 with an arm 16 that is fast upon a rockshaft 17 supported in bearings 171, 171, Figs. 1 and 3, with which the stand 172 is provided, the said rockshaft 17 having a second arm 18 which is connected by a rod 19 with an arm 201 that is fast upon the rockshaft 200 of a treadle 20. The treadle 20 has in connection therewith a spring 21 that tends to move the parts in the direction to permit the engaging end of the disengaging dog or pawl 12 to stand in the path of rotation of the shoulder 111 on the disk 11 of the clutch, but when pressure is exerted by the operator upon the said treadle the movement of the latter withdraws the said disengaging dog or pawl from the said shoulder so as to permit the clutch to close and connect the gear-wheel 10 and the work-carrier operating shaft together.

At 22 is a tripping-cam or tappet which is mounted upon the work-carrier operating shaft 93. The movement of the treadle and its connections, when the same are operated to disengage the dog or pawl 12 from the shoulder 111 of the disk 11, causes the tripping-tail 142 of the tripping dog or pawl 141 to be raised into the path of rotation of the said tripping-cam or tappet. As the said shaft 93 revolves, the tripping-cam or tappet strikes the tail 142 of the tripping dog or pawl 141, disengaging the latter from the disk 13 of the disengaging dog or pawl 12, and permitting the said dog or pawl 12 to be swung by its spring 123 into the path of rotation of the shoulder 111 of the disk 11 pertaining to the clutch.

The devices last described insure the automatic disengagement of the clutch at the end of a single revolution of the work-carrier operating shaft 93 in case pressure should be maintained upon the treadle 20 by the operator.

As in the machine of the application of August 9, 1902, each of the rotary tools 30 is carried by a shaft 31 which is mounted in bearings in the arms 33, 33, of a swinging or rocking tool-carrier frame, the said arms being secured to a rockshaft 34 which is journaled in a bearing with which the fixed upright portion 3 of the machine-frame is provided. As shown best in Fig. 1, each tool-shaft 31 has connected therewith by a universal-joint coupling one end of a shaft-section 35, the latter having its other end connected to a shaft 36 which is mounted in bearings with which the fixed uprights 2, 2, of the machine-frame are provided, the said shaft 36 being provided with a band-pulley 37 receiving a driving-band 38 which also passes around a band-pulley 39 on an operating shaft 391. Fig. 1 shows the driving connections for one tool-shaft 31 and portions of those for others of the said shafts, the greater part of these connections being omitted, however, in order to simplify the drawings. The devices by means of which the tool-carrier frames are rocked or oscillated for the purpose of traversing the tools 30, 30, etc., around the heels which are being operated upon, are shown in Figs. 1 and 5, and comprise a pinion 40 which is fast with the rockshaft 34 of each of the respective tool-carrier frames, the curved rack 41 meshing with the series of pinions 40, 40, and mounted to turn upon the shaft 42, the pinion 43 which is fixedly connected with the said curved rack 41, the rack-bar 44 having teeth which mesh with those of the pinion 43, and the cam-disk 45 having a groove 46 which receives the stud or roll 47 carried by the said rack-bar 44. The cam-disk 45 is fixed upon the shaft 48, which latter is journaled in bearings with which the fixed upright 3 and one of the fixed uprights 2 are provided. The breasting-cutter 60 is in operative connection with the shaft 48, and is actuated from the said shaft by means of the bevel-gear 61 upon the said shaft, a second bevel-gear, 62, which meshes with the said bevel-gear 61 and is fixed upon the lower end of an inclined shaft 63 that turns in a bearing with which a stand 64 is provided, the said inclined shaft 63 being provided at its upper end with a crank-arm 65, which latter is connected by means of a connecting-rod 66 with a collar 67 at one end of a plunger 68 by which the breasting-cutter 60 is carried. The plunger 68 works through guide-bearings in a stand 69 which is attached to the fixed upright 3 of the machine-frame. The shaft 48 has combined therewith suitable driving mechanism, and start and stop devices by means of which at the will of the operator the said shaft 48 may be caused to make one revolution and then automatically arrested. Thus, at 71 is a band-pulley that is mounted upon the shaft 48 with capacity to turn freely thereon, and driven by means of a band 72 passing around its periphery and also around a driving-pulley (not shown) on a counter-shaft or the like. The said loose band-pulley 71 is formed with one member of a friction-clutch, the other member of which, 73, is also mounted loosely upon the shaft 48.

At 74 is a spur-pinion turning in unison with the clutch-member 73 and engaging with a spur-gear 75 which turns upon a support at 76 in connection with one of the fixed uprights 2 of the machine-frame, the said spur-gear 75 having fast therewith a spur-pinion 77 which meshes with a spur-gear 78 that is fast with the shaft 48.

At 711 is a shipper-lever which engages with the grooved hub of the clutch-member 71 and is joined by a link 712 to one arm of a bell-crank 713 which has operatively combined therewith a spring 714 tending to separate the clutch-members and to hold them separated, and a treadle 715 by means of which the clutch may be closed in opposition to the action of the spring. The closing of the clutch in consequence of pressure upon the treadle causes the shaft 48 to be rotated for the purpose of actuating the breasting-cutter 60 and producing the required traversing movements of the rotary tools.

At 716 is a controlling-cam which is mounted upon the shaft 48 and arranged to engage with a pin or roll which is carried by a controlling-lever 717 with which the link 712 is connected also. The said controlling-cam is formed with a notch or depression to receive the pin or roll of the controlling-lever 717. In the position of the controlling-cam which is occupied thereby while the shaft 48 stands at rest, the notch or depression is presented for the entrance of the pin or roll aforesaid, and the latter is held therein by the action of the spring 714. In this position of the controlling-cam the clutch-members are permitted to remain separated. When the treadle is operated to close the clutch, the controlling-lever 717 is moved to withdraw its pin or stud from the notch or depression of the controlling-cam, and as soon as the shaft 48 begins to rotate the acting portion of the controlling-cam engages with the pin or stud of the controlling-lever to hold the clutch closed until, as one revolution of the shaft 48 is completed, the notch or depression of the controlling-cam is presented again to the pin or stud of the pin or roll of the controlling-lever, whereupon the spring 714 is permitted to act to effect the unclutching and the movement of shaft 48 and the parts which are actuated therefrom is arrested.

For the purpose of rendering it unnecessary to move the work-carrier in the direction of the length of its axis of rotation, to withdraw the work-carrier and the boots or shoes which are supported thereby from proximity to the rotary tools so as to clear the said tools during the advancing movement of partial rotation of the work-carrier, I construct and arrange the cam 45 to cause the rocking tool-carriers to assume for the purposes of clearance positions in which the tools will not interfere with either the heels or the parts of the work-carrier during the shift of the latter. This is accomplished by so constructing and arranging or setting the cam 45 as to bring the tool-carriers to rest in positions with the tools at the outer sides radially of the rounded back-portions of the heels, as indicated in Figs. 1 and 5, as the cam arrives at the end of its rotation and is brought to a stand-still.

When the breasting-cutter is advanced and acts upon the heel which is in line therewith, considerable strain is imposed upon the arm 51 of the work-carrier which supports the shoe to which such heel pertains. For the purpose of backing-up or supporting said arm against springing under the said strain, a backing-up device 201 is mounted upon the stand 202 on the machine-framing adjacent the work-carrier. The said backing-up device consists of an arm which is journaled upon the said stand. Each arm 57 of the work-carrier is furnished with a projecting portion 203 to coöperate with the backing-up device 201. The movement of the work-carrier which places a work-supporting arm 51 in line with the breasting-cutter presents the said arm alongside the backing-up device 201, with the projection 203 in position for being engaged with such device. Through such engagement, the pressure resulting from the action of the breasting-cutter against the heel of a shoe carried by the said arm is sustained by the backing-up device, and the tendency to springing of the arm is avoided. The backing-up device is movable into and out of working position, and connected with the treadle 20 so that when the said treadle is depressed the backing-up device 201 is moved from its working position so as to leave the work-carrier free from obstruction to its movements. The said backing-up device 201 is constituted by an arm which is journaled upon the stand 202 and connected by the connecting-rod 205 with the treadle 20. The action of the spring 21 in raising the treadle 20 also restores the backing-up device 201 to its normal position. To insure firm and close contact between the contacting faces of the backing-up device and the projection 203 of each arm 51, such faces are oppositely beveled or inclined, as indicated in Figs. 1 and 3.

What is claimed as the invention is:—

1. In a machine for finishing the heels of boots and shoes, the combination with one or more heel-finishing tools, of the work-carrier provided with a plurality of work-supports or jacks, the wheel connected with the said work-carrier and formed with the radial slots, a rotatable carrier provided with a pin or roll which works in the said slots for the purpose of intermittingly advancing the work-carrier, means to lock the work-carrier in position when at rest, a power-train for operating the said rotatable carrier, and manually-controlled shipper-devices enabling the advance of the work-carrier by power to take place at will during the working of the machine.

2. In a machine for finishing the heels of boots and shoes, the combination with one or more heel-finishing tools, of the work-carrier provided with a plurality of work-supports or jacks, the wheel connected with the said work-carrier and formed with the radial slots, a rotatable carrier provided with a pin or roll which works in the said slots for the purpose of intermittingly advancing the work-carrier, means to lock the work-carrier in position when at rest, power-driven devices for actuating the said rotatable carrier, such devices embracing a clutch, and manually-controlled clutch shipping devices through which the advance of the work-carrier by power may be caused to take place at will during the working of the machine.

3. In a machine for finishing the heels of boots and shoes, the combination with one or more heel-finishing tools, of the work-carrier provided with a plurality of work-supports or jacks, the wheel connected with the said work-carrier and formed with the radial slots and intervening concavities, a rotatable carrier provided with a pin or roll to work in the said slots for the purpose of advancing the work-carrier, the said carrier having in connection therewith the locking convexity to enter the concavities of the wheel to lock the work-carrier in position, a power-train for operating the said rotatable carrier, and manually-controlled shipper-devices enabling the advance of the work-carrier by power to take place at will during the working of the machine.

4. The combination with a supporting arm, of the screw applied to the said arm and provided with an operating handle, a cross-head applied to the said screw, and a double yoke pivotally connected to the arms of the said cross-head and having the cross-bars provided with the swiveled block or plate.

5. The combination with the work-carrier provided with a plurality of work-supports or jacks, and means to rotate the said work-carrier step by step, of a series of racking tool-carriers, tools mounted in connection with the said tool-carriers, and means for rocking the said tool-carriers to traverse the respective tools around the pieces of work held by the corresponding work-supports or jacks, constructed to terminate the movement of the said carriers with the tools in positions which will permit the rotary shift of the work-carrier.

In testimony whereof we affix our signatures each in the presence of two witnesses.

SARAH M. EVANS,
*Administratrix of the estate of Warren C. Evans, deceased.*
EUGENE H. TAYLOR.

Witnesses to the signature of Sarah M. Evans:
DANIEL GILMAN,
CHARLES E. BYINGTON.

Witnesses to the signature of Eugene H. Taylor:
CHAS. F. RANDALL,
EDITH J. ANDERSON.

Correction in Letters Patent No. 916,924.

It is hereby certified that in Letters Patent No. 916,924, granted March 30, 1909, upon the application of Sarah M. Evans, of Exeter, New Hampshire, administratrix of the estate of Warren C. Evans, deceased, and Eugene H. Taylor, of Hyde Park, Massachusetts, for an improvement in "Machines for Finishing the Heels of Boots and Shoes," an error appears in the printed specification requiring correction, as follows: On page 5, line 107, the word "racking" should read *rocking;* and that the said Letters Patent should be read with this correction therein that the same may conform to the record of the case in the Patent Office.

Signed and sealed this 11th day of May, A. D., 1909.

[SEAL.]

E. B. MOORE,
*Commissioner of Patents.*